United States Patent
Gazsi et al.

(10) Patent No.: US 7,526,636 B2
(45) Date of Patent: Apr. 28, 2009

(54) PARALLEL MULTITHREAD PROCESSOR (PMT) WITH SPLIT CONTEXTS

(75) Inventors: Lajos Gazsi, Düsseldorf (DE); Jinan Lin, Ottobrunn (DE); Soenke Mehrgardt, Deisenhofen (DE); Xiaoning Nie, Neubiberg (DE)

(73) Assignee: Infineon Technologies AG, Munich (DE)

( * ) Notice: Subject to any disclaimer, the term of this patent is extended or adjusted under 35 U.S.C. 154(b) by 185 days.

(21) Appl. No.: 10/987,935

(22) Filed: Nov. 12, 2004

(65) Prior Publication Data

US 2005/0198476 A1    Sep. 8, 2005

(30) Foreign Application Priority Data

Nov. 14, 2003  (DE)  ............... 103 53 268

(51) Int. Cl.
*G06F 9/00* (2006.01)
(52) U.S. Cl. .................................. 712/228
(58) Field of Classification Search .......... 712/228
See application file for complete search history.

(56) References Cited

U.S. PATENT DOCUMENTS

| | | | |
|---|---|---|---|
| 5,349,680 A * | 9/1994 | Fukuoka ................ 718/108 |
| 5,361,337 A * | 11/1994 | Okin ..................... 712/228 |
| 6,253,313 B1 * | 6/2001 | Morrison et al. ......... 712/226 |
| 6,507,862 B1 | 1/2003 | Joy et al. |
| 6,629,237 B2 * | 9/2003 | Wolrich et al. .......... 712/228 |

* cited by examiner

*Primary Examiner*—Alford W Kindred
*Assistant Examiner*—Benjamin P Geib
(74) *Attorney, Agent, or Firm*—Maginot, Moore & Beck (57) ABSTRACT

The present invention relates to a parallel multithread processor (1) with split contexts, with M parallel-connected standard processor root units (2) being provided for instruction execution of program instructions for different threads (T), and with N context memories (3) being provided, which each temporarily store a current state of a thread (T), and with a thread monitoring unit (4) being provided, by means of which each standard processor root unit (2) can be connected to each context memory (3). The invention accordingly provides a processor architecture in which a number N of different context memories (3) and corresponding threads (T) are effectively fully networked with a number M of standard processor root units (2). This means that use is made not only of paralleling of the standard processor root units (2), but also of the threads (T) and of the context memories (3).

32 Claims, 7 Drawing Sheets

FIG 1

PRIOR ART

FIG 2A

PRIOR ART

PARALLEL MULTITHREAD PROCESSOR (PMT) WITH SPLIT CONTEXTS

FIELD AND BACKGROUND OF THE INVENTION

The invention relates to a parallel multithread processor (PMT) with split contexts, which contains two or more parallel-connected standard processor root units (SPRE) for instruction execution of program instructions for different threads. The multithread processor has two or more context memories, which each temporarily store a current processor state of a thread which is currently being executed, and a thread monitoring unit, by means of which each standard processor root unit can be connected to each context memory.

Embedded processors and their architectures are measured by their computation power, their power consumption, their throughput, their costs and their real-time capability. The principle of pipelining is used in order to increase the throughput and the processor speed. The basic idea of pipelining is to subdivide any desired instructions or commands into processing phases with the same time duration. A pipeline with different processing elements is possible when the processing of an instruction can itself be split into a number of phases with disjunct process steps which can be carried out successively (as described in T. Bayerlein, O. Hagenbruch: "Taschenbuch Mikroprozessortechnik" [Microprocessor technology manual], 2nd Edition Fachbuchverlag Leipzig from the Karl Hanser Verlag Munich-Vienna, ISBN 3-446-21686-3). The original two instruction execution phases of the von Neumann model, specifically instruction fetching and instruction processing, are in this case further subdivided, since this subdivision into two phases has been found to be too coarse for pipelining. The pipeline variant which is essentially used for RISC processors contains four instruction processing phases, specifically instruction fetching, instruction coding/operand fetching (instruction decoding/operand fetch), instruction execution and write-back.

In the first phase, the instruction fetching phase, the instructions are loaded from the memory into a pipeline register for the processor.

The second instruction phase, which is an instruction decoding/operand fetching phase, comprises two data-independent process steps, specifically instruction decoding and fetching operands. In the instruction decoding step, the data coded in the instruction code is decoded in a first data processing step. In this case, the operation rule (opcode), the addresses of the operands to be loaded, the type of addressing and further additional signals which significantly influence the subsequent instruction execution phases are determined in a known manner. In the operand fetching processing step, all of the addressed operands are loaded from the registers for the processor.

In the third instruction phase, the instruction execution phase, the computation operations are executed in accordance with the decoding commands or instructions. The operation itself, as well as the circuit paths and processor registers used in the process, depend essentially on the nature of the instruction to be processed.

The results of the operations, including so-called additional signals, status flags or flags, are stored in the appropriate registers or external memories in a known manner in the fourth and final phase, the write-back phase. This phase completes the arithmetic processing of a machine command or machine instruction.

A conventional computer architecture for a von Neumann machine has a standard processor unit SPE which processes instructions or program commands for a thread T (monitoring thread).

A standard processor unit SPE essentially has an instruction fetch unit BHE, an instruction decoding/operand fetch unit BD/OHE, an instruction execution unit BAE and a write-back unit ZSE, as well as a pipeline register, a processor monitoring unit PKE, register files K, a program counting register PZR and a data bus DB.

A thread T denotes a monitoring thread for a code, a source code or a program, with data relationships existing within a thread T and with weak data relationships existing between different threads T (as described in Chapter 3 of T. Bayerlein, O. Hagenbruch: "Taschenbuch Mikroprozessortechnik" [Microprocessor technology manual], 2nd Edition Fachbuchverlag Leipzig from the Karl Hanser Verlag Munich-Vienna, ISBN 3-446-21686-3).

One characteristic of a process is that a process always accesses its own memory area. A process comprises two or more threads. Accordingly, a thread is a program part of a process step. A context of a thread is the processor state of a processor which is processing this thread or instructions for this thread. The context of a thread is accordingly defined as a temporary processor state during the processing of the thread by this processor. The context is helped by the hardware of the processor, specifically the program counting register PZR or program counter PC, the register file or context memory K, and the status register SR associated with it.

Figure 1:
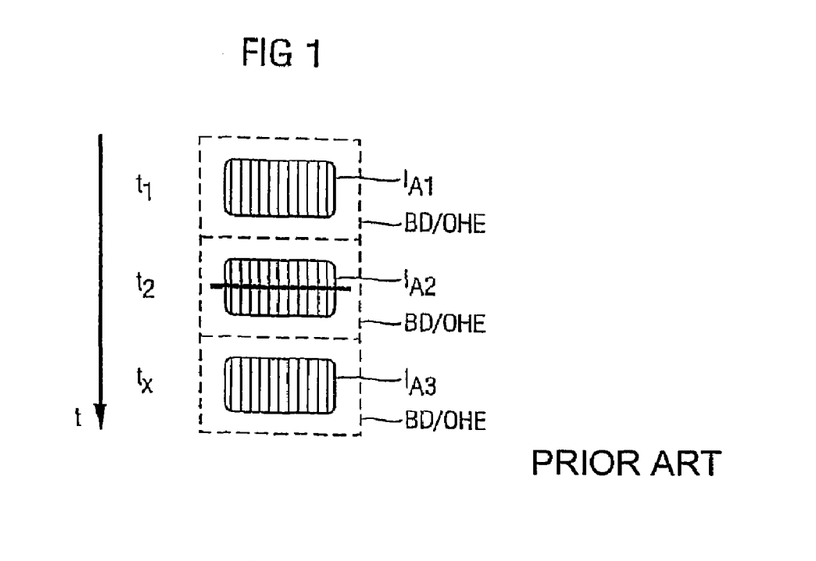
FIG. 1 shows a flowchart of a conventional von Neumann machine according to the prior art.

FIG. 1 shows an example in order to explain the problems with conventional von Neumann machines with regard to their throughput and their blocking probability. The von Neumann machine or standard processor unit SPE illustrated in FIG. 1 has, corresponding to the subdivision of an instruction I into various instruction phases, a hardware subdivision (not shown) of the processor into different components, an instruction fetch unit BHE, an instruction decoding/operand fetch unit BD/OHE, an instruction execution unit BAE and a write-back unit ZSE. The standard processor unit SPE uses the pipeline method for processing, with the instruction decoding/operand fetch unit BD/OHE for the standard processor unit SPE being illustrated in each clock cycle $t_1$, $t_2$, $t_x$ in FIG. 1, in order to illustrate the problems.

The instruction decoding/operand fetch unit BD/OHE for the standard processor unit SPE decodes a j-th instruction $I_{kj}$ for a thread T-k in each clock cycle $t_i$. Based on the example shown in FIG. 1, the instruction decoding/operand fetch unit BD/OHE processes the first instruction $I_{A1}$ for the thread T-A in the clock cycle $t_1$, and the instruction decoding/operand fetch unit BD/OHE decodes the second instruction $I_{A2}$ for the thread T-A in the clock cycle $t_2$. Because, for example, operands relating to this instruction $I_{A2}$, which have to be waited for, have to be fetched on the basis of the instruction $I_{12}$ for the thread T-A, this results in blocking of the pipeline for the standard processor unit SPE.

Since it has not been possible for the instruction decoding/operand fetch unit BD/OHE to process any instructions for a certain number of clock cycles owing to the latency time caused by the instruction $I_{12}$, the instruction decoding/operand fetch unit does not decode the instruction $I_{A3}$ until the clock cycle $t_x$.

The standard processor unit SPE according to the prior art processes commands and instructions for a specific thread T-A at each time (here: $t_1$, $t_2$, $t_x$). This simple computer architecture results in a problem when the thread T-A to be processed is temporarily blocked. There may be various reasons for temporary blocking of a thread T, for example as a result of a latency time when accessing an external memory or an internal register.

Temporary blocking of the standard processor unit SPE occurs when the processor pipeline or the instruction decoder cannot process any further program command or any further instruction for a thread T, or cannot decode them.

If a thread T which has been processed by the standard processor unit SPE is temporarily blocked, then the standard processor unit SPE is also blocked for this time. Blocking considerably reduces the performance and throughput of a processor. The probability of a thread T being blocked by internal blocking (for example as a result of a latency time for a register access) or by external blocking (for example in the event of a cache miss), is referred to as the blocking probability $p_T$ for that thread. If it is assumed that the blocking probability for a thread T is $p_T$, then the blocking probability $p_{VN}$ for the von Neumann machine illustrated schematically in FIG. 1 is likewise $p_T$.

A multithread processor MT is a processor which uses hardware to process a number of contexts by providing a program counting register PZR, a register bank RB and a status register SR for each of this number of contexts.

Figure 2A:
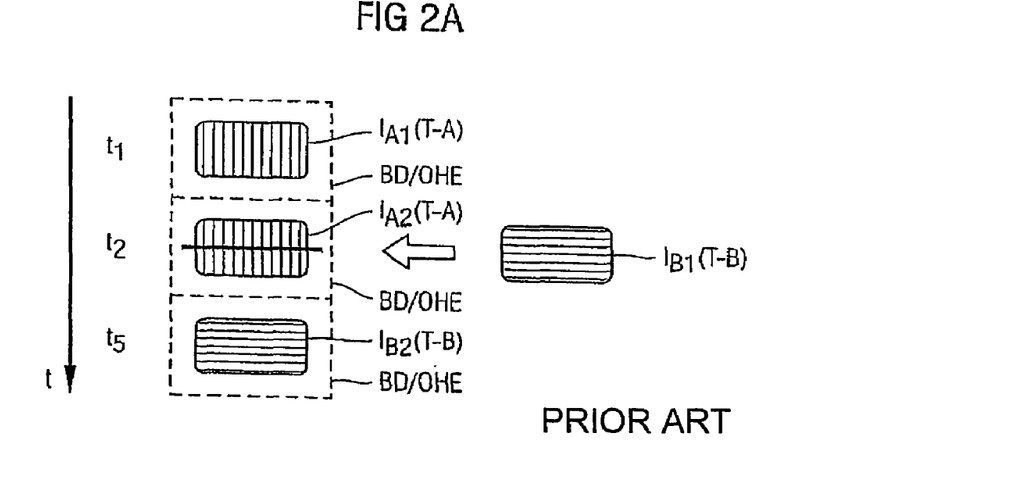
FIG. 2a shows a flowchart of a conventional multithread processor according to the prior art.

FIG. 2a illustrates, schematically, a conventional multithread processor MT, in which a standard processor unit SPE is processing a number of threads T or monitoring threads, light-weight tasks, separate program codes, and common data areas. In FIG. 2a, without any restriction to generality, the threads T-A, T-B represent any given number N of threads and are hard-wired to the standard processor unit SPE within a multithread processor MT, thus ensuring more efficient switching between individual threads T. This reduces the blocking probability $p_{MT}$ for a multithread processor MT in comparison to the blocking probability $p_{VN}$ of a von Neumann machine (FIG. 1) for the same thread blocking probability $p_T$, since result operations of the memory minimize inefficient processor waits. In order to illustrate the described situation, FIG. 2a shows the instruction decoding/operand fetch unit BD/OHE for the standard processor unit SPE at the times $t_1$, $t_2$, $t_5$ during the processing of instructions $I_{Aj}$ (T-A) for the thread (T-A) and during the processing of instructions $I_{Bj}$ (T-B) for the thread (T-B). At the time $t_2$, the thread T-A is a blocked thread T*-A (for the reasons mentioned above), and is substituted by the thread T-B, which is likewise hard-wired to the standard processor unit SPE. From then on (after the time $t_5$), the standard processor unit SPE processes instructions $I_{Bj}$ for the thread T-B until the thread T-B is blocked. Furthermore, if $p_T$ denotes the blocking probability for a thread T, the blocking probability $p_{MT}$ for a multithread processor MT is dependent on the number N of context memories K-1–K-N which are hard-wired to a standard processor unit SPE, with a context memory K-i providing the hardware implementation for a thread T-k. The blocking probability $p_{MT}$ of the multithread processor MT is $p_T^N$, on the assumption of statistical independence of the individual threads T which each represent independent data areas. The blocking probability $p_{MT}$ is accordingly admittedly reduced, but the throughput is increased only insignificantly in comparison to a von Neumann machine as shown in FIG. 1.

If the pipeline for the standard processor unit SPE becomes blocked when carrying out an instruction or a program command for a thread T, signals which can be used to control the thread switching are generated within the SPE.

Figure 2B:
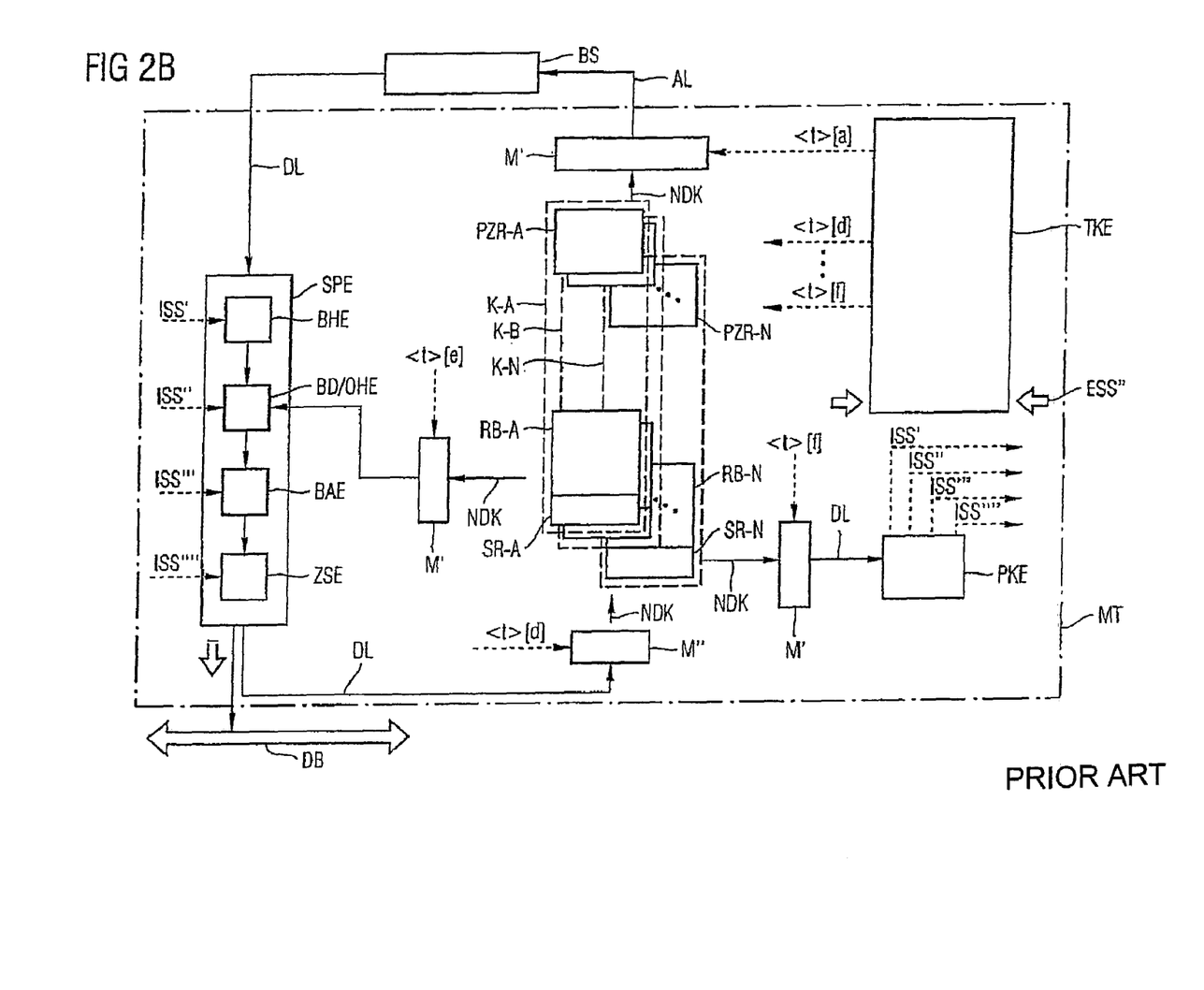
FIG. 2b shows a block diagram of a conventional multithread processor according to the prior art.

FIG. 2b shows a schematic block diagram of a conventional multithread processor MT according to the prior art with a connection to an instruction memory BS and a connection to a data bus DB. A conventional multithread processor MT according to the prior art essentially has a standard processor unit SPE, N context memories K for N threads T, a thread monitoring unit TKE and a processor monitoring unit PKE. The said components of the multithread processor MT are essentially connected to one another via data lines DL, address lines AL and multiplexers M', M". Each of the N context memories K has a program counting register PZR, a register bank RB and a status register SR. An N×1 multiplexer M' is used to apply data from the N program counting registers PZR for the N context memories K to an address line AL, which is connected to the instruction memory BS. Based on these addresses, the instructions I for the respective threads T which are stored in the instruction memory BS are fetched from the instruction memory BS, and are made available to the standard processor unit SPE. The standard processor unit SPE has an instruction decoding/operand fetch unit BD/OHE, an instruction execution unit BAE and a write-back unit ZSE, corresponding to the phases of the pipeline method.

The instructions I, which result from the instruction fetches, for the N threads T are decoded in the instruction decoding/operand fetch unit BD/OHE, and the addressed operands are read from the register bank RB or from the status register SR of the appropriate context memory K for the associated thread T via an N×1 multiplexer M'. The instruction execution unit BAE then executes the decoded instruction I for the thread T with its associated operands, and passes the result of the operation as well as potential flag data characters and additional characters to the write-back unit ZSE. In the case of a memory instruction, the write-back unit ZSE if necessary writes the received data to the data bus DB or, via a 1×N multiplexer, to the respective context memory K. In this case, the results of the arithmetic/logic operations are stored in the associated register bank RB, and the flags and additional characters are stored in the associated status register SR.

The flag or additional characters in the status register SR are provided via an N×1 multiplexer M' to the processor monitoring unit PKE, which uses internal control signals ISS to control the instruction decoding/operand fetch unit BD/OHE, the instruction execution unit BAE and the write-back unit ZSE.

The thread monitoring unit TKE controls the processes of writing to and reading the context memory K via the respective multiplexers M', M" by means of multiplexer control signals <t>. In a multiplexer control signal <t>, t denotes a thread number for a thread T. The thread monitoring unit TKE uses internal event control signals ESS' and external control signals ESS" as an input, with the internal event control signals ESS' being produced by the standard processor unit SPE, and the external event control signals ESS" being produced by external devices, such as external memories or the program code.

Figure 3A:
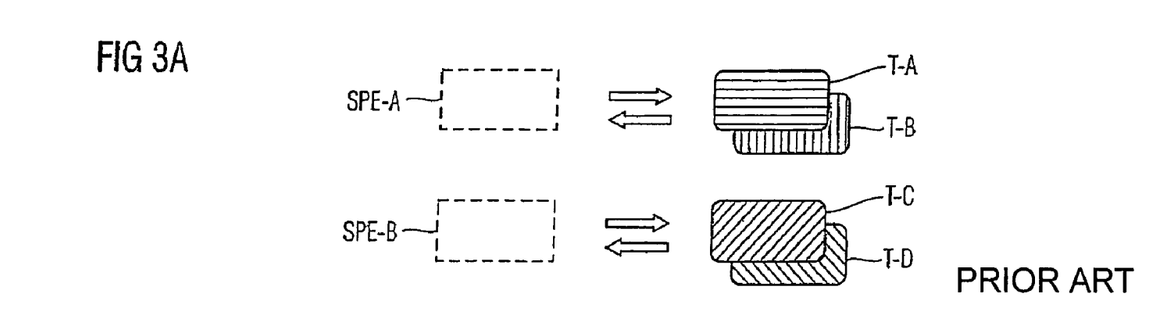
FIG. 3a shows a schematic illustration of a parallel multithread processor according to the prior art.

FIG. 3a shows one known development of the prior art, with a number of multithread processors MT in this case being used in parallel. In this case, a dedicated set of context memories K is available to each standard processor SPE, with the context memories K being hard-wired to the respective standard processor unit SPE.

FIG. 3a shows a parallel multithread processor MT, having two standard processor units SPE-A, SPE-B and four context memories for four disjunct threads T-A, T-B, T-C and T-D. The threads T-A, T-B and their hardware implementations and context memories K-A, K-B are permanently connected or hard-wired to the standard processor unit SPE-A. In a corresponding way, the threads T-C, T-D and their context memories K-C, K-D, respectively, are permanently connected or hard-wired to the standard processor unit SPE-B.

Figure 3B:
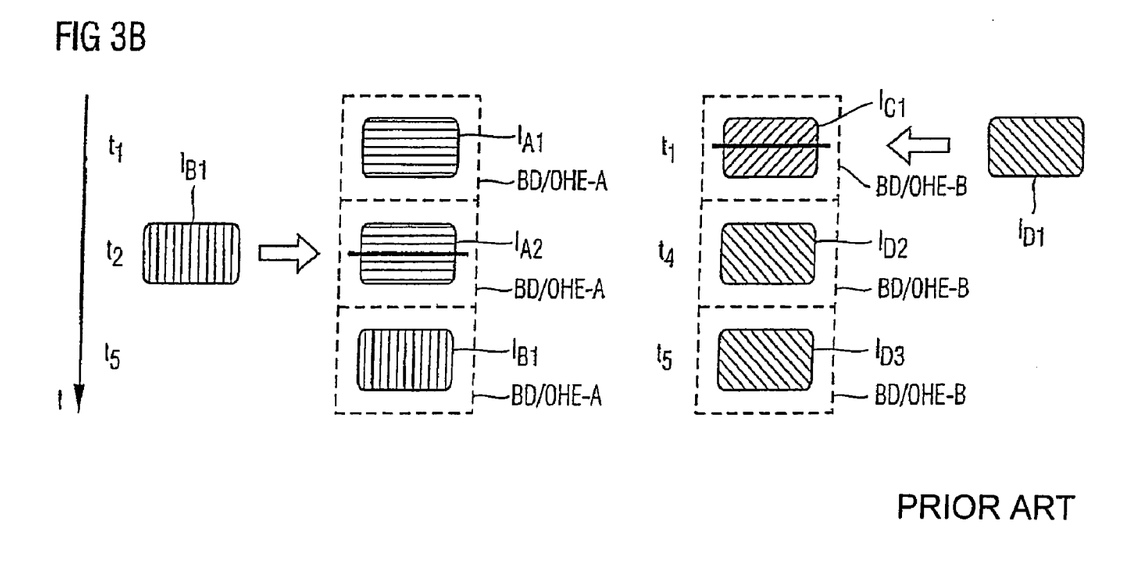
FIG. 3b shows a flowchart of a conventional parallel multithread processor according to the prior art.

FIG. 3b shows two instruction decoding/operand fetch units BD/OHE for two parallel standard processor units SPE-A, SPE-B, with the blocking probability of the overall system being the same as the blocking probability of a multithread processor MT as shown in FIG. 2a, accordingly being $p_T^N$. The throughput of the arrangement shown in FIG. 3b is essentially twice as great as the throughput of the arrangement shown in FIG. 2a. In general, the throughput of M parallel multithread processors is M times as great as that of a single multithread processor MT, although the blocking probability of the overall system increases sharply.

SUMMARY

An object of at least some embodiments of the present invention is thus to provide a multithread processor which has a reduced blocking probability and a relatively high throughput or performance.

The idea on which the present invention is based is essentially for the N threads and their corresponding N context memories not to be subdivided into sets as in the case of the conventional multithread processors according to the prior art, with each of these threads being directly connected or wired to an associated standard processor root unit, but for the context memories to be provided such that each standard processor root unit (SPRE) has access to each context memory.

According to the invention, the instructions for the N threads or the N context memories are distributed dynamically between the M standard root processor units.

In this case, the N context memories and M standard processor root units are connected by means of multiplexers. When the respective instruction or the respective program command is executed in each pipeline stage of each respective processor or each respective standard processor root unit, the corresponding context is selected via the multiplexers, with each instruction or each program command requiring its corresponding context within the standard processor root unit. Control signals <t,p> are used for selection of the appropriate context, with t denoting the thread number and p denoting the standard processor root number or number of the standard processor root unit. The control signals <t,p> control or switch the multiplexers.

According to the invention, a multithread processor is provided for this purpose, which has M parallel-connected standard processor root units, which provide instruction execution of program instructions for different threads, in which case the standard processor root units can be connected to two or more (N) context memories, which each temporarily store a current state of a thread. The connections are controlled by means of a thread monitoring unit, by means of which each standard processor root unit can be connected to each context memory.

The advantages of the arrangement according to the invention are, in particular, that the association of N threads and N context memories with M standard processor root units results in a minimal blocking probability and a high throughput.

The use of standard processor root unit means that the entire system, essentially the total number of standard processor root units and the total number of threads, is scaleable, and individual components can also be replaced easily.

Since the standard processor root units comply with the pipeline principle according to von Neumann, this furthermore results in a deterministic instruction execution time, which provides the arrangement according to the invention with a real-time capability.

Advantageous developments of the parallel multithread processor (PMT) with split contexts can be found in the dependent claims.

According to one preferred development, each standard processor root unit has an instruction decoder.

According to one preferred development, each standard processor root unit has an operand fetch unit.

The instruction decoder decodes the program instruction, and potential operands are fetched by means of the operand fetch unit from the context memory selected by means of the control signals <t,p>, for further processing.

An instruction execution unit carries out the arithmetic/logic function to be executed, using the fetched operands.

A write-back unit writes the results of the arithmetic/logic operations and, optionally, additional characters or flags by means of multiplexers and appropriate control signals <t,p> to the context memories and to the data memory, respectively.

According to a further preferred development of the invention, each standard processor root unit has an associated processor monitoring unit.

The processor monitoring unit controls each processing phase or pipeline stage for each standard processor root unit individually, by means of internal control signals for each pipeline stage.

According to a further preferred development of the invention, each context memory has a program counting register, a register bank and a status register.

The program counting register is used for temporary storage of a program counter, which is used to control the fetching of the instructions for the respective threads from the instruction memory.

The register bank is used for temporary storage of operands, with operands on the one hand being written to the operand fetch unit and, downstream from the subsequent instruction execution unit, being written once again by the write-back unit to the registers, with potentially new data contents.

The status register is used for temporary storage of additional characters or status flags, with the additional characters or status flags being available as an input signal not only for further arithmetic/logic operations but also for the processor monitoring unit.

According to a further preferred development of the invention, the number M of standard processor root units is less than or equal to the number N of context memories. This results in sufficient instructions from different threads for the M standard processors being available at all times in the instruction buffer stores, so that there are no latency times, or only minimal latency times.

According to a further preferred development of the invention, the arrangement according to the invention has at least one instruction buffer store which can be split into N instruction buffer stores which can be addressed by the thread monitoring unit, in which case the N instruction buffer stores can be connected to each standard processor root unit.

The N instruction buffer stores mean that instructions for the N threads are available to the M standard processor root units at all times, thus minimizing the blocking probability, owing to reduced waiting times.

According to a further preferred development of the invention, the instruction buffer stores can be connected to an instruction memory in order to allow the thread monitoring unit to read program instructions, with the program instructions which are read from the instruction memory being addressed by the program counting registers for the context memories.

According to a further preferred development of the invention, up to M instructions are read at the same time from the instruction buffer store (6).

The addressing of the program instructions which are read, by the program counting registers for the context memories and their control by the thread monitoring unit by means of the control signals <t,p> control the filling of the instruction buffer stores by the thread monitoring unit on a clock-cycle sensitive basis, that is to say the control process is carried out in such a way that each pipeline stage for each standard processor root unit is connected by means of the appropriate context in each clock cycle. The central control by the thread monitoring unit allows optimized filling of the instruction buffer stores, and thus allows the blocking probabilities to minimized.

According to a further preferred development of the invention, the data which is calculated by the standard process root units is transferred via a data bus to a data memory. The calculated data can be stored externally by means of this external interface via a data bus to a data memory.

According to a further preferred development of the invention, each standard processor root unit processes the program instructions supplied from the thread monitoring unit, sequentially by means of a pipeline method. In consequence, two or more instructions are held virtually at the same time in the instruction processing phase of a processor, with each instruction, connected to the appropriate context, being located exclusively in one pipeline stage and thus in an exclusively associated part of the process. The provision of the pipeline method results in an increase in the throughput of a standard processor root unit.

According to a further preferred development of the invention, each standard processor root unit processes a program instruction supplied to it, provided that this is not a data access instruction, within a predetermined number of clock cycles.

According to a further preferred development of the invention, the number of instruction buffer stores which are provided is equal to the number of context memories, so that a dedicated instruction buffer store is available for each thread and context memory, with the instruction buffer store preferably temporarily storing program instructions, and passing them on, on the basis of the FIFO organization (first in/first out).

This has the advantage that the instructions for each thread are in an organized form upstream of the standard processor root units. This minimizes the switching time for a thread change for a standard processor root unit.

According to a further preferred development of the invention, the thread monitoring unit receives event control signals on the input side, temporarily stores internal states, and generates multiplexer control signals on the output side.

According to a further preferred development of the invention, the event control signals which are received by the thread monitoring unit comprise both internal event control signals and external event control signals.

According to a further preferred development of the invention, the internal event control signals are produced by the standard processor root units.

The thread monitoring unit thus receives data relating to the operating mode in which the individual standard processor root units are operating, so that the thread monitoring unit can react appropriately to the various operating modes of the individual standard processor root units. The thread monitoring unit uses this data to generate the control signals <t,p>, which are sent to the appropriate multiplexers, in order to control the multiplexers, on a clock-cycle sensitive basis.

According to a further preferred development of the invention, the external event control signals are produced by external devices, such as an interrupt, or by external memories.

According to a further preferred development of the invention, the standard processor root units may comprise a part of a digital signal processor, of a protocol processor or of a universal processor (general purpose processor).

According to a further preferred development of the invention, the instruction execution unit for the standard processor root unit may be an arithmetic/logic unit (ALU) or an address generator unit (AGU).

According to a further preferred development of the invention, an instruction fetch unit is formed by a multiplexer, N data lines, N instruction buffer stores, N data lines and a multiplexer.

According to a further preferred development of the invention, the thread monitoring unit drives switching networks as a function of the event control signals. In this case, the thread monitoring unit supports the following functionalities:

The thread monitoring unit decides which N threads are selected in order that instructions for these N threads are fetched by the instruction fetch unit from the instruction memory. If N instructions can be fetched by two or more threads at the same time by the instruction fetch unit from the instruction memory, the thread monitoring unit provides the appropriate N thread numbers t.

The thread monitoring unit dynamically decides which of the M standard processor root units will be allocated to the respective thread, in order that the program instruction or the instruction for a thread is fetched by the instruction fetch unit from the instruction memory, and is supplied to the pipeline for the selected standard processor root unit. If M program instructions are passed on at the same time from the instruction buffer stores to the respective pipeline, the thread monitoring unit provides the appropriate standard processor root number for the corresponding standard processor root unit.

An instruction for a thread T-k which has been fetched by the instruction fetch unit is temporarily stored in the appropriate instruction buffer store which is provided for the thread T-k. In this case, that multiplexer which connects the appropriate program instruction from the instruction fetch unit to the corresponding instruction buffer store for the thread T-k is controlled by the multiplexer control signals <t,p> generated by the thread monitoring unit.

In the pipeline stage for the instruction decoding/operand fetch unit BD/OHE, the appropriate delayed control signal <t,p> controls a multiplexer, which connects the appropriate context to the corresponding pipeline stage, such that the register bank is connected to the appropriate standard processor root unit. Downstream of the instruction execution unit and the write-back unit, the control signal <t,p> which has once again been delayed controls a multiplexer, which connects each standard processor root unit with the appropriate context memory, such that it is possible to write to the appropriate context memories and register banks.

In the event of a program instruction for a thread <t> which initiates blocking, an exception event signal <e> is generated by the appropriate standard processor root unit, with the exception event signal <e> being part of the internal event control signals for each standard processor root unit.

When the respective exception event signal <e> occurs, the thread number for the blocked thread <t> is temporarily stored in a thread number buffer store within the thread monitoring unit, with the waiting thread T then waiting for a thread reactivation signal <x>.

A thread reactivation signal <x> is part of the external event control signals. The thread number buffer store for the waiting threads T can store all of the thread numbers for the N threads <t=[t_1, ... ,t_n]> at the same time, if all M processors are blocked.

When the corresponding exception event signal <e> occurs, the standard processor root unit number <p> at which the blocked thread has been processed is stored in a standard processor root number buffer store, which is provided within the thread monitoring unit. The standard processor root number <p> can be bridged, that is to say it can be passed on without being temporarily stored, in order to reduce the thread switching overhead.

When an exception event signal <e> occurs, a switching trigger signal is generated within the thread monitoring unit by the waiting thread T in order to indicate to the thread monitoring unit whether there is a free processor and a ready thread T. The next instructions or the next program instruction are or is driven by the thread monitoring unit.

When a thread reactivation signal <x> occurs, a thread number <t> is transferred from the waiting register within the thread monitoring unit to a ready register, which is provided within the thread monitoring unit. The thread number <t> can be bridged, that is to say it can be passed on without being temporarily stored, in order to reduce the thread switching overhead.

According to a further preferred development of the invention, the thread monitoring unit has at least one thread number buffer store, which stores a queue of threads, with at least the thread number and the corresponding thread state (ready, waiting) being provided for one thread.

According to a further preferred development of the invention, the thread monitoring unit has at least one standard processor root number buffer store. This temporarily stores the standard processor root number, which references a standard processor root unit which is available for processing program instructions and is not processing any program instructions in the current clock cycle.

According to a further preferred development of the invention, the thread number buffer store and the standard processor root number buffer store are each in the form of a FIFO memory (first in/first out).

According to a further preferred development of the invention, a thread number, which references a thread T, is temporarily stored in the thread number buffer store for the thread monitoring unit as a function of the event control signals, if the thread T is not being processed by a standard processor root unit. According to a further preferred development of the invention, at most N thread numbers are fetched by means of the switching network from the thread number buffer store as a function of the event control signals, in order to produce a fetched thread number and in order to process program instructions for that thread T.

According to a further preferred development of the invention, a standard processor root number which references a specific standard processor root unit is temporarily stored in the standard processor root number buffer store as a function of the event control signals, if no program instructions for a thread T are being processed by the specific standard processor root unit.

According to a further preferred development of the invention, at most M standard processor root numbers are fetched by means of the switching network from the standard processor root number buffer store as a function of the event control signals in order to produce at most M fetched standard processor root numbers, so that program instructions are processed by the standard processor root units which have been referenced by means of the standard processor root numbers.

According to a further preferred development of the invention, the thread monitoring unit generates a multiplexer control signal by means of a thread number which has been fetched from the thread number buffer store and by means of a standard processor root number which has been fetched from the standard processor root number buffer store, such that the program instructions for the thread T which is referenced by means of the fetched thread number is processed by the standard processor root unit which is referenced by means of the fetched standard processor root number.

According to a further preferred development of the invention, the multiplexer control signal <t,p> for the respective correct clock cycle controls the N×M and the M×N multiplexers in each case when the address of the program instruction or the program instruction for the thread T which is referenced by means of the thread number and is intended to be processed by the standard processor root unit referenced by means of the standard processor root number is located at the appropriate point in the parallel multithread processor.

Exemplary embodiments of the invention will be explained in more detail in the following description and are illustrated in the drawings. Identical reference symbols in the figures denote identical or functionally identical elements.

DETAILED DESCRIPTION

Identical reference symbols in the figures denote identical or functionally identical elements.

Although the present invention is described in the following text with reference to processors or microprocessors and their architectures, it is not restricted to these, but may be used in many ways.

Figures 4A, 4B:
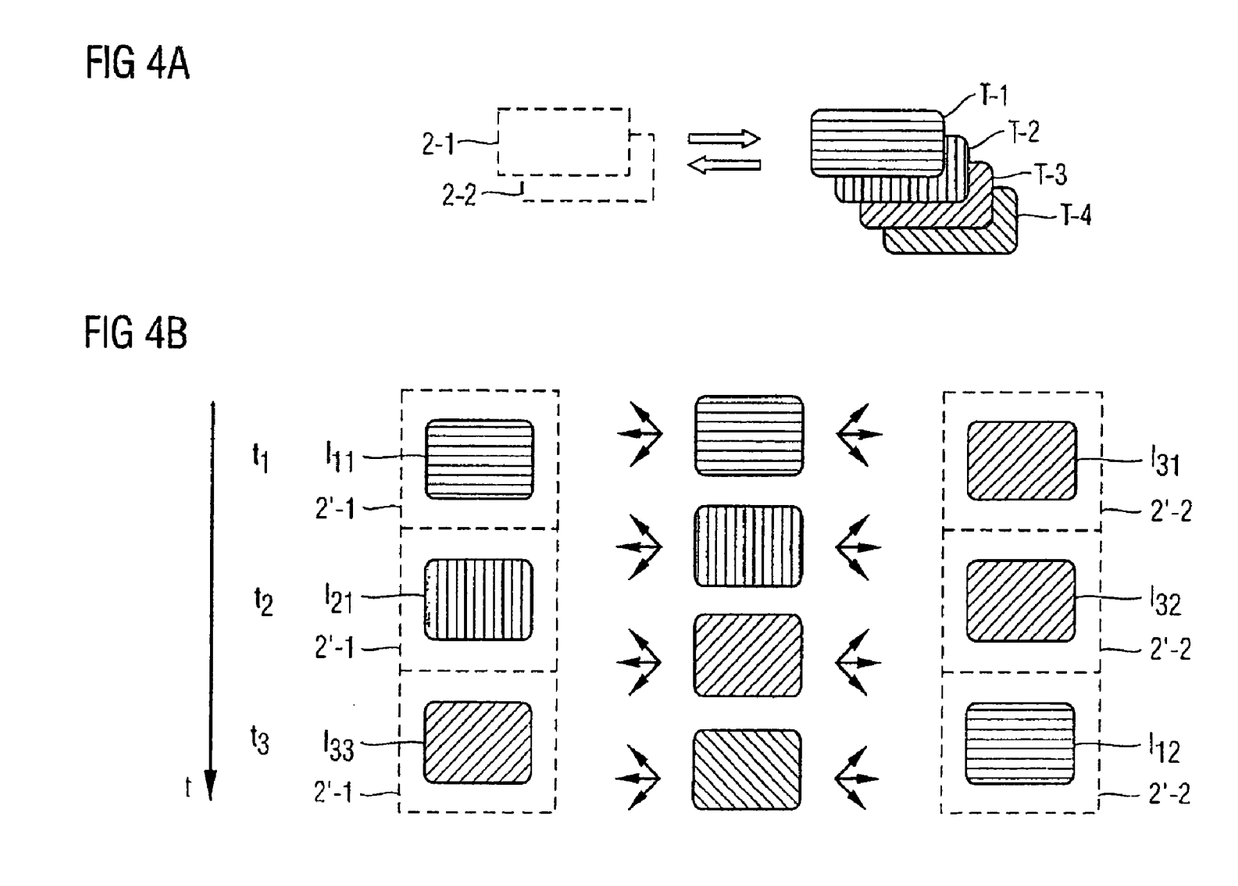
FIG. 4a shows a schematic illustration of a parallel multithread processor according to the invention, with a split context according to one preferred embodiment of the invention.
FIG. 4b shows a flow chart of the thread processing by the parallel multithread processor according to the invention with a split context.

FIG. 4a shows, schematically, an arrangement according to the invention of a parallel multithread processor 1. A parallel multithread processor 1 comprises, inter alia, a number M of standard processor root units 2 and a number N of threads T, with an associated context memory 3 being provided, in the form of hardware, for each thread T. The N context memories 3 are connected to the M standard processor root units 2 via M×N or N×M multiplexers 11, 10 (not shown). According to the invention there is no fixed association between the N context memories 3 or the N threads T, and the M standard processor root units 2. The lack of the fixed association between the context memories 3 and the standard processor root units 2 increases the flexibility of the computer architecture such that the total number of possible tuples <t,p> is increased considerably, with a thread t being processed, controlled by the multiplexer control signal <t>, at the time t by a standard processor root unit 2, controlled by the multiplexer control signal <p>. The increased flexibility in the association of the thread T with a standard processor root unit 2 results in the overall system having a reduced blocking probability, a shorter latency time for a memory access and, in consequence, a higher throughput and performance.

According to FIG. 3b, two standard processor root units 2-1, 2-2 and four different threads T-1, T-2, T-3, T-4 are available in the embodiment, as shown in FIG. 4b, of the parallel multithread processor 1 according to the invention with split contexts. The illustrated example, in which four different threads T-1, T-2, T-3, T-4 are processed by two standard processor root units 2-1, 2-2, shows that the arrangement according to the invention of a parallel multithread processor 1 with a split context results, in comparison to a conventional arrangement of a parallel multithread processor MT as shown in FIG. 3b, in lower blocking probabilities and hence in a higher throughput and performance. FIG. 4b shows the two instruction decoding/operand fetch units 2' for the two standard processor root units 2-1, 2-2, which process the thread T-1, the thread T-2, the thread T-3 or the thread T-4 at the times $t_1$, $t_2$, $t_3$, with one standard processor root unit 2-i in each case processing a different thread T-j at a time $t_1$, $t_2$ and $t_3$. According to this example, the overall system is blocked when more than two threads are temporarily blocked at a defined time t.

$$P(>2\_T\_blocked) = \sum_{i=3}^{4} p^i (1-p)^{4-i} = p^3 < p^2 \quad \forall p \in [0;1]$$

$p^2$ is the blocking probability for the given example (two standard processor root units processing four threads) according to the arrangement of a parallel multithread processor MT without split context (FIG. 3b), and $p^3$ is the blocking probability for the given example (two standard processor root units processing four threads) based on the arrangement according to the invention of a parallel multithread processor 1 with a split context (FIG. 4b).

The arrangement according to the invention, that is to say a parallel multithread processor 1 with a split context, has a lower blocking probability than the arrangement according to the prior art. The lower blocking probability increases the throughput of the overall system in comparison to the arrangement according to the prior art, and latency times are reduced.

Figure 4C:
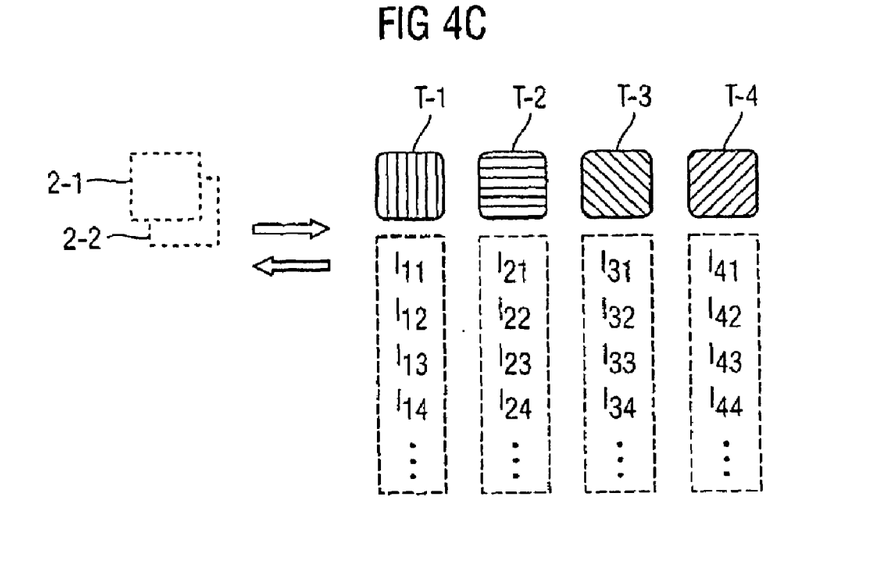
FIG. 4c shows an extension to a parallel multithread processor with a split context according to one preferred embodiment of the invention as shown in FIG. 4a with an illustration of the monitoring threads for a thread being added.

FIG. 4c shows an extension to FIG. 4a, with the illustration in this case showing that each thread T comprises successive instructions I. By way of example, the thread T-1 comprises the sequence of the instructions $I_{11}$, $I_{12}$, $I_{13}$ etcetera.

Figure 4D:
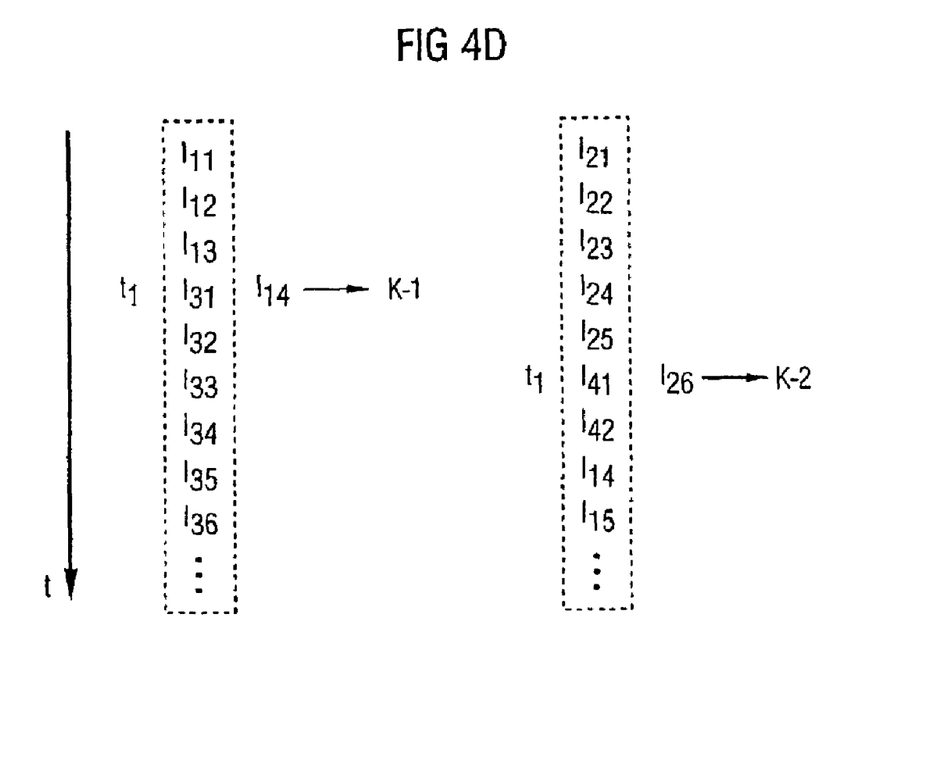
FIG. 4d shows a mechanism for fully-networked thread distribution for a parallel multithread processor according to the invention with a split context.

FIG. 4d shows a mechanism for fully-networked thread distribution for a parallel multithread processor according to the invention with a split context, in which a parallel multithread processor 1 according to the invention with split contexts processes instructions for different threads T even in the event of potential blocking, using the example from FIG. 4c for this purpose.

FIG. 4d shows how the two instruction decoding/operand fetch units 2' for the two standard processor root units 2-1, 2-2 process instructions for the threads T-1, T-2, T-3 and T-4 in a chronological sequence. Before the time $t_1$, the instruction decoding/operand fetch unit 2'-1 for the standard processor root unit 2-1 is processing instructions for the thread T-1. In the illustrated example, the instruction $I_{14}$ for the thread T-1 is temporarily blocked at the time $t_1$. Since the standard processor root unit 2-2 is processing the instruction $I_{24}$ for the thread T-2 at the time $t_1$, the threads T-3 and T-4 are also available to the standard processor root unit 2-1 at the time $t_1$. The standard processor root unit 2-1 is assigned the instruction $I_{31}$ for the thread 3 by the thread monitoring unit 4. The instruction decoding/operand fetch unit 2'-1 for the standard processor root unit 2-1 can thus process the instruction $I_{31}$ for the thread T-3 at the time $t_1$, and is therefore not blocked. From then on, the instruction decoding/operand fetch unit 2'-1 for the standard processor root unit 2-1 processes instructions for the thread T-3 until the thread T-3 is temporarily blocked. At the time $t_2$, an instruction for the thread T-2 is temporarily blocked. This blocked instruction $I_{26}$, like the previously blocked instruction $I_{14}$, is written back to the appropriate context memory K, and is substituted by the instruction $I_{41}$ for the thread T-4. The standard processor root unit 2-2 is thus not blocked at the time $t_2$, either.

Figure 4E:
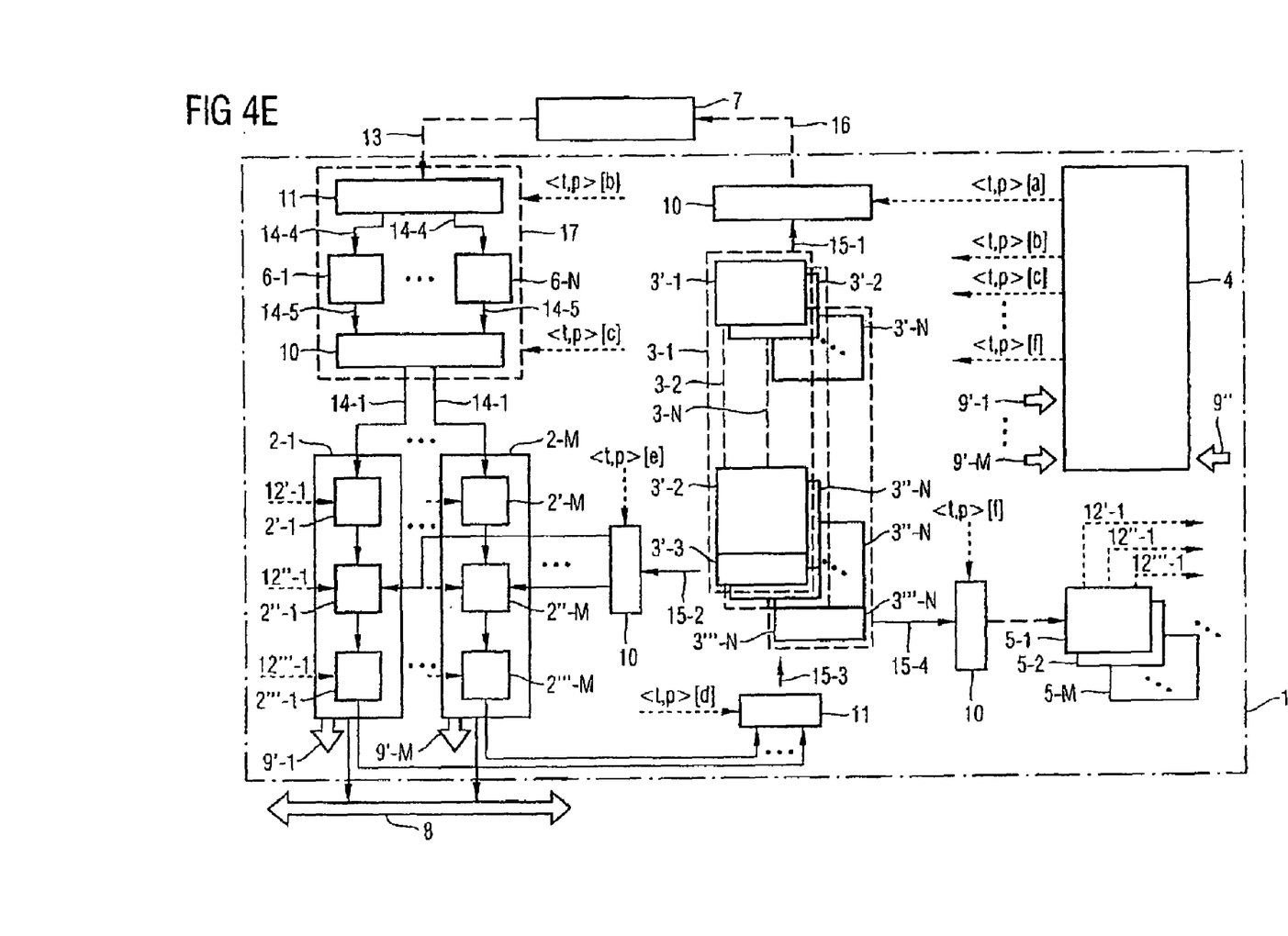
FIG. 4e shows a block diagram of a parallel multithread processor with a split context according to one preferred embodiment of the invention.

FIG. 4e shows a block diagram of one particularly preferred embodiment of a parallel multithread processor 1 according to the invention with split contexts. The multithread processor 1 has connections for an instruction memory 7 and for a data bus 8. Furthermore, the multithread processor 1 contains M standard processor root units 2-1, . . . ,2-M, N context memories 3-1, . . . ,3-N, a thread monitoring unit 4, M processor monitoring units 5-1, . . . ,5-M, N instruction buffer stores 6-1, . . . ,6-N, N×M multiplexers 10 and M×N multiplexers 11.

Each standard processor root unit 2 has an instruction decoding/operand fetch unit 2', an instruction execution unit 2'' and a write-back unit 2''', with the instruction decoding/operand fetch unit 2', the instruction execution unit 2'' and the write-back unit 2''' being arranged downstream from a pipeline method, in order to process instructions.

The instruction fetch unit (17) according to the invention has a multiplexer (11), N data lines (14-4), N instruction buffer stores (6), N data lines (14-5) and a multiplexer (10).

An associated process monitoring unit 5-i is provided for each standard processor root unit 2-i. A processor monitoring unit 5-i controls its associated standard processor root unit 2-i by means of internal control signals 12-i. A first internal control signal 12'-i for the instruction decoding/operand fetch unit in this case controls the instruction decoding/operand fetch unit 2'-i. A second internal control signal 12''-i for the instruction execution unit controls the instruction execution unit 2''-i, and a third internal control signal 12'''-i for the write-back unit controls the write-back unit 2'''-i.

Each context memory 3-j has a program counting register 3'-j, a register bank 3''-j and a status register 3'''-j. The program counting register 3'-j temporarily stores a program counter for a thread T-j. The contents of the N program counting registers 3' for N threads T are applied to an M-channel address bus 16 via an N×M multiplexer 10.

The M instructions, which are referenced by the data contents of the program counting registers 3', for threads T are read via an M-channel data bus 13 from the instruction memory 7 by the instruction unit 17. The data contents which are read are transferred via an M×N multiplexer 11 to N instruction buffer stores 6. An associated instruction buffer store 6 is provided for each of the N threads T. M commands are applied to M data lines 14-1 via an N×M multiplexer 10 from the N instruction buffer stores 6. The M instructions or commands which are on the data lines 14-1 are distributed between the M standard processor root units 2.

The instruction decoding/operand fetch unit 2'-$i$ for the standard processor root units 2-$i$ decodes, for example, an instruction for the thread T-j. The decoded instruction for the thread T-j includes, inter alia, addresses of operands which are required to carry out the next instruction. The addressed data contents of the operands are stored in a context memory 3-$j$ which is associated with the thread T-j, to be more precise in the register bank 3'-$j$ for the context memory 3-$j$.

The data contents of the operands are transferred via an N×M multiplexer 10 from the register bank 3'-$j$ for the context memory 3-$j$ to the instruction decoding/operand fetch unit 2'-$i$ for the standard processor root unit 2-$i$, with the multiplexer 10 being controlled by the thread monitoring unit 4 by means of the multiplexer control signal $<t,p>^{(e)}$. This multiplexing is controlled via the control signals $<t,p>$ such that the correct context memory 3-$j$ is connected to the appropriate pipeline stage of the correct standard processor root unit 2-$i$.

The instruction execution unit 2"-$i$ for the standard processor root unit 2-$i$ carries out the arithmetic/logic operation contained in the instruction for the thread T-j, using the operands which have been fetched from the register bank 3'-$j$.

Once the arithmetic/logic operation has been carried out with the operands that have been fetched, the result of the operation for the thread T-j as well as additional characters and flags are applied by the write-back unit 2'''-$i$ to a data line 14-2.

The same data contents are potentially applied to a data line 14-3, in addition to the data line 14-2, when a memory instruction occurs. The M data lines 14-3 are provided for connecting the multithread processor 1 to the data bus 8. The data contents of the M results of the M standard processor root units are transferred via the data bus 8 to an external memory.

The result of the operation for the thread T-j as well as the additional characters and flags are accepted by the data line 14-2 via an M×N multiplexer 11, and the result of the arithmetic/logic operation is transferred to the register bank 3'-$j$ for the context memory 3-$j$, and additional characters and flags are transferred to the status register 3"-$j$ for the context memory 3-$j$.

The data contents of the N status registers 3"' are transferred by means of an N×M multiplexer 10 to the processor monitoring units 5. The processor monitoring unit 5 contains a processor monitoring unit 5-$i$ for each standard processor root unit 2-$i$. The processor monitoring unit 5-$i$ calculates internal control signals 12 from the data contents from the status registers 3''', specifically an internal control signal for the instruction decoding/operand fetch unit 12', an internal control signal for the instruction execution unit 12", and an internal control signal for the write-back unit 12'''.

The thread monitoring unit 4 controls the multiplexers 10 and 11, respectively, via the multiplexer control signals $<t,p>^{(a)}$-$<t,p>^{(f)}$. By way of example, a multiplexer control signal $<t,p>$ indicates which thread T-j will be processed by which standard processor root unit 2-$i$, with t being a thread number for the respective thread T, and p being a standard processor root unit number for the respective standard processor root unit 2.

An N×M multiplexer 10 has the function of applying the data from an N-channel data bus to an M-channel bus.

An M×N multiplexer 11 has the function of applying the data from an M-channel data bus to an N-channel data bus.

The M internal event control signals 9' include, inter alia, data relating to blocked threads T, internal interrupts, waiting times and exception event signals $<e>$, and make this data available to the thread monitoring unit 4.

External event control signals 9" are provided for the thread monitoring unit 4 by external devices. Examples of this include external interrupts, which are generated by external devices.

FIG. 4$f$ shows a schematic block diagram of the thread monitoring unit according to the invention for the parallel multithread processor according to the invention with a split context.

Figure 4F:
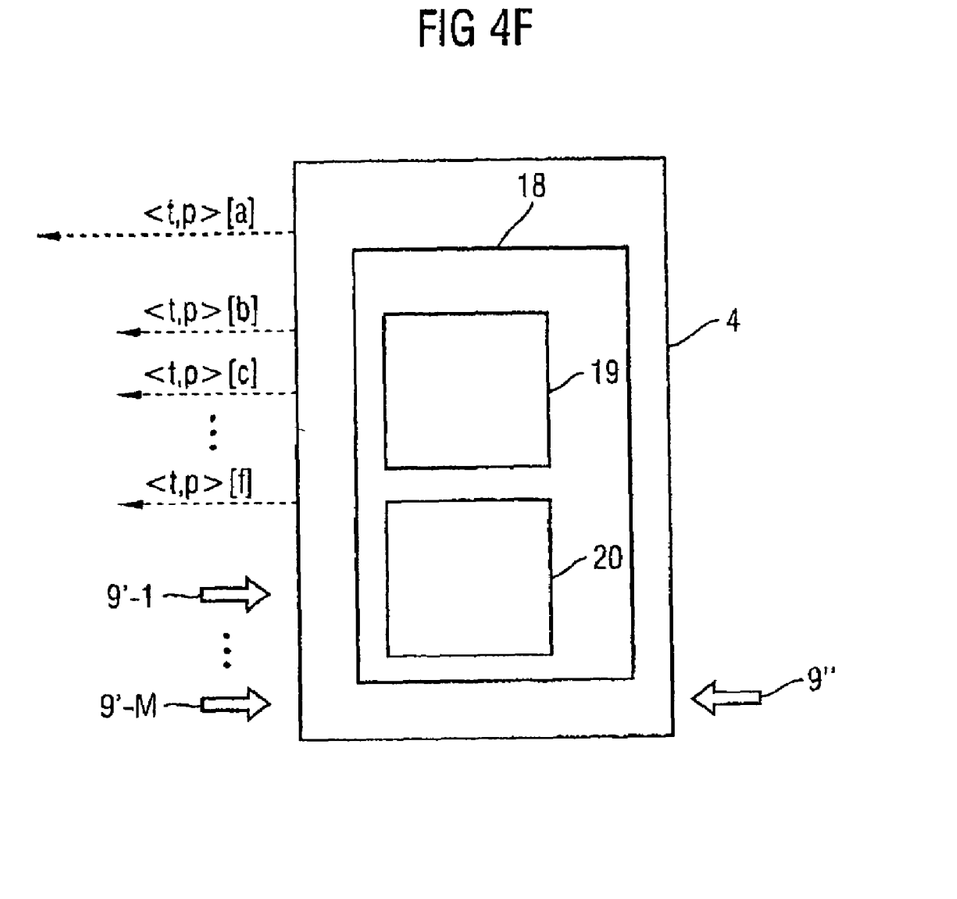
FIG. 4f shows a schematic block diagram of the thread monitoring unit according to the invention for the parallel multithread processor according to the invention with a split context.

The thread monitoring unit 4 has a switching network 18, a thread number buffer store 19 and a standard processor root number buffer store 20.

On the input side, the thread monitoring unit 4 receives the internal event control signals 9'-1 to 9'-N, and the external event control signals 9". The event control signals 9 which are received on the input side, are processed by means of the switching network 18, the thread number buffer store 19 and the standard processor root number buffer store 20. The processing results in the generation of the multiplexer control signals $<t,p>^{(a)}$-$<t,p>_{(f)}$, which are sent in the correct clock cycle to the corresponding N×M multiplexers 10 (which are not shown) and to the corresponding M×N multiplexers 11 (which not shown).

Although the present invention has been described above with reference to preferred exemplary embodiments, it is not restricted to them but can be modified in many ways.

| List of reference symbols: | |
|---|---|
| MT | Multithread processor |
| SPE | Standard processor unit |
| SPE-A | First standard processor unit |
| SPE-B | Second standard processor unit |
| BD/OHE | Instruction decoding/operand fetch unit |
| BAE | Instruction execution unit |
| ZSE | Write-back unit |
| K; K-A, . . . , K-N | Context memory |
| PZR; PZRA, . . . , PZR-N | Program counting register |
| RB; RB-A, . . . , RB-N | Register bank |
| SR; SR-A, . . . , SR-N | Status register |
| TKE | Thread monitoring unit |
| PKE | Processor monitoring unit |
| BS | Instruction memory |
| DB | Data bus |
| NDK | N-channel data channel |
| ESS | Event control signals |
| ESS` | Internal event control signal |
| ESS`` | External event control signals |
| M' | N × 1 multiplexer |
| M" | 1 × N multiplexer |
| $<t>$ | Multiplexer control signal |
| ISS | Internal control signal |
| ISS` | Internal control signal for instruction decoding/operand fetch unit |
| ISS`` | Internal control signal for instruction execution unit |
| ISS``` | Internal control signal for write-back unit |
| T; T-A, . . . , T-N | Thread |

-continued

List of reference symbols:

| | |
|---|---|
| T*; T*-1, . . . , T*-N | Blocked thread |
| DL | Data line |
| AL | Address line |
| I | Instruction |
| 1 | Parallel multithread processor |
| 2; 2-1, . . . 2-M | Standard processor root unit |
| 2`; 2`-1, . . . 2`-M | Instruction decoding/operand fetch unit |
| 2``; 2``-1, . . . 2``-M | Instruction execution unit |
| 2```;2```-1,. . . 2```-M | Write-back unit |
| 3;3-1, . . . , 3-N | Context memory |
| 3`; e`-1, . . . , 3`-N | Program counting register |
| 3``; 3``-1, . . . , 3``-N | Register bank |
| 3```; 3```-1, . . . , 3```-N | Status register |
| 4 | Thread monitoring unit |
| 5; 5-1, . . . , 5-M | Processor monitoring unit |
| 6; 6-1, . . . , 6-N | Instruction buffer store |
| 7 | Instruction memory |
| 8 | Data bus |
| 9 | Event control signals |
| 9`; 9`-1, . . . , 9`-N | Internal event control signal |
| 9`` | External event control signals |
| 10 | N × M multiplexer |
| 11 | M × N multiplexer |
| 12; 12-1, . . . , 12-M | Internal control signal |
| 12`;12`-1,. . . , 12`-M | Internal control signal for instruction decoding/operand fetch unit |
| 12``;12``-1, . . . , 12``-M | Internal control signal for instruction execution unit |
| 12```; . . . , 12```-M | Internal control signal for write-back unit |
| t | Thread number |
| p | Standard processor root number |
| e | Exception event signal |
| x | Thread reactivation signal |
| <t, p> | Multiplexer control signal |
| 13 | M-channel data bus |
| 14; 14-1, . . . , 14-5 | Data line |
| 15; 15-1, . . . , 15-4 | N-channel data bus |
| 16 | M-channel address bus |
| 17 | Instruction fetch unit |
| 18 | Switching network |
| 19 | Thread number buffer store |
| 20 | Standard processor root number buffer store |

The invention claimed is:

1. A multithread processor comprising:
(a) a pipeline including
 (a1) a plurality of M parallel-connected standard processor root units operable to execute program instructions for different threads;
 (a2) a plurality of N sets of context memories, each containing information regarding a current processor state of a corresponding thread; and
 (a3) multiplexers configured to connect the N context memories and the M standard processor root units; and
(b) a thread monitoring unit operable to selectively cause operable connection of each of the M parallel-connected standard processor root units to a corresponding set of context data;
wherein the thread monitoring unit controls the multiplexers via multiplexer control signals for selection of the appropriate context;
wherein M is equal to N; and
wherein the instructions for the N context memories are distributed dynamically between the M standard processor root units.

2. The multithread processor according to claim 1, wherein each standard processor root unit includes an instruction decoding/operand fetch unit configured to decode a program instruction and to fetch operands which are addressed within the program instruction.

3. The multithread processor according to claim 1, wherein each standard processor root unit includes an instruction execution unit configured to execute a decoded program instruction.

4. The multithread processor according to claim 3, wherein each standard processor unit includes a write-back unit configured to write back operation results of the executed decoded program instruction.

5. The multithread processor according to claim 3, wherein the instruction execution unit of at least one of the plurality of standard processor root units includes at least one of a group consisting of an arithmetic/logic unit (ALU) and an address generator unit (AGO).

6. The multithread processor according to claim 3, further comprising an instruction fetch unit, the instruction fetch unit comprising a first multiplexer, N instruction buffers coupled to the multiplexer, and a second multiplexer coupled to the N instruction buffers.

7. The multithread processor according to claim 3, wherein the instruction decoding/operand fetch unit is operable to decode the program instruction and is further operable to fetch addressed operands from the plurality of N sets of context data in memory.

8. The multithread processor according to claim 1, wherein each standard processor root unit includes an associated processor monitoring unit.

9. The multithread processor according to claim 1, wherein each context memory includes a register configured to store a program counter, a register bank configured to store operands, and a status register configured to store at least one status flag.

10. The multithread processor according to claim 1, further comprising N instruction buffer stores which can be addressed by the thread monitoring unit, and wherein each of the N instruction buffer stores may be operably selectively connected to each standard processor root unit.

11. The multithread processor according to claim 10, wherein the each of the instruction buffer stores is configured to be selectively connected to one or more instruction memories under the control of the thread monitoring unit, the selectively connected instruction buffer store configured to read program instructions addressed by a program counter of one of the N sets of context data.

12. The multithread processor according to claim 11, wherein the number of instruction buffer stores corresponds to the number of sets of context data, each instruction buffer store corresponding to a thread.

13. The multithread processor according to claim 10, wherein up to M instruction buffer stores may be operably selectively connected to the M standard processor root processors at the same time.

14. The multithread processor according to claim 1, wherein each of the standard processor root units are operably coupled to provide processed data to a data bus.

15. The multithread processor according to claim 1, wherein each standard processor root unit is operable to process program instructions received under the control of the thread monitoring unit sequentially using a pipeline method.

16. The multithread processor according to claim 15, wherein each standard processor root unit is operable to process each program instruction except at least some data access instructions within a predetermined number of clock cycles.

17. The multithread processor according to claim 1, wherein the plurality of M parallel-connected standard processor root units are substantially identical.

18. The multithread processor according to claim 1, wherein the thread monitoring unit is further operable to: receive event control signals, temporarily store information based on the event control signals, and produce multiplexer control signals on the output side based on the information.

19. The multithread processor according to claim 18, wherein the event control signals include event control signals generated internal to the multithread processor and event control signals generated external to the multithread processor.

20. The multithread processor according to claim 19, wherein the standard processor root units are further operable to generate the internally-generated event control signals.

21. The multithread processor according to claim 1, wherein at least one of the plurality of standard processor root units comprises a part of a group consisting of a digital signal processor, a protocol processor and a universal processor.

22. The multithread processor according to claim 1, wherein the thread monitoring unit includes a switching network.

23. The multithread processor according to claim 22, wherein the switching network includes at least one thread number buffer configured to store a queue of thread values, each of the thread values including a thread number.

24. The multithread processor according to claim 23, wherein the switching network includes at least one buffer, each buffer configured to store a value that references standard processor root unit which is available for processing program instructions and is not processing any program instructions in the current clock cycle.

25. The multithread processor according to claim 24, wherein the switching network is further operable to store each of the thread values in the thread number buffer store responsive to event control signals.

26. The multithread processor according to claim 25, wherein the switching network is further operable to store each of the standard root processor number in at least one buffer responsive to event control signals.

27. The multithread processor according to claim 24, wherein the thread monitoring unit is operable to generate a multiplexer control signal based on one of the thread values obtained from the thread number buffer store and one of the standard processor root numbers obtained from the at least one buffer, and wherein the thread monitoring unit is operable to provide the multiplexer control signal to at least a first multiplexer coupled between the sets of context data and the standard root processor unit.

28. The multithread processor according to claim 22, wherein the switching network includes at least one buffer, each buffer configured to store a value that references a standard processor root unit which is available for processing program instructions and is not processing any program instructions in the current clock cycle.

29. The multithread processor according to claim 28, wherein the at least one buffer comprises a (first in/first out) FIFO memory.

30. The multithread processor according to claim 28, wherein the at least one buffer comprises a plurality of buffers, and wherein at most M standard processor root numbers are fetched from the plurality of buffers.

31. A multithread processor comprising:
   (a) a pipeline including
      (a1) a plurality of M parallel-connected standard processor root units operable to execute program instructions for different threads;
      (a2) a plurality of N context memories, each containing information regarding a current processor state of a corresponding thread; and
      (a3) multiplexers adapted to connect the N context memories and the M standard processor root units; and
   (b) a thread monitoring unit arranged outside the pipeline, the thread monitoring unit operable to selectively cause operable connection of each of the M parallel-connected standard processor root units to a corresponding set of context data;
   wherein the thread monitoring unit controls the multiplexers via multiplexer control signals for selection of the appropriate context; and
   wherein M is less than or equal to N.

32. The multithread processor according to claim 31, wherein
   the tread monitoring unit is further operable to
      receive event control signals,
      temporarily store information based on the event control signals, and
      produce multiplexer control signals on the output side based on the information;
   and wherein the event control signals include event control signals generated internally to the multithread processor and event control signals generated externally to the multithread processor.

* * * * *